United States Patent
Sekiguchi

[11] 3,970,366
[45] July 20, 1976

[54] HIGHLY VARIABLE MAGNIFICATION ZOOM LENS SYSTEM HAVING A DIAPHRAGM WITH ITS APERTURES DIAMETER VARIED IN RELATION WITH ZOOMING

[75] Inventor: Takeshi Sekiguchi, Tokyo, Japan
[73] Assignee: Canon Kabushiki Kaisha, Tokyo, Japan
[22] Filed: Mar. 20, 1974
[21] Appl. No.: 453,050

[30] Foreign Application Priority Data
Mar. 23, 1973 Japan............................. 48-33310

[52] U.S. Cl............................... 350/184; 350/207; 350/186; 350/187
[51] Int. Cl.² ....................................... G02B 15/14
[58] Field of Search ............ 350/184, 186, 187, 207

[56] References Cited
UNITED STATES PATENTS
3,081,671  3/1963  Cook .................................. 350/186
3,603,726  9/1971  Garber et al..................... 350/184 X FOREIGN PATENTS OR APPLICATIONS
1,103,046  3/1961  Germany ............................ 350/184

*Primary Examiner*—Paul A. Sacher
*Attorney, Agent, or Firm*—Toren, McGeady and Stanger

[57] ABSTRACT

A highly variable magnification zoom lens system in which a first zoom lens is connected from an object side and then a second zoom lens is connected from behind said first zoom lens. A first diaphragm for determining the relative aperture of the total zoom lens system is provided between said first zoom lens and the second zoom lens. A second diaphragm with its aperture diameter being varied in an association with the zooming of the second zoom lens is provided in a fixed imaging lens at an imaging plane side within the second zoom lens. This second diaphragm shields an upper light beam out of off-axis rays to prevent generation of halo.

6 Claims, 10 Drawing Figures

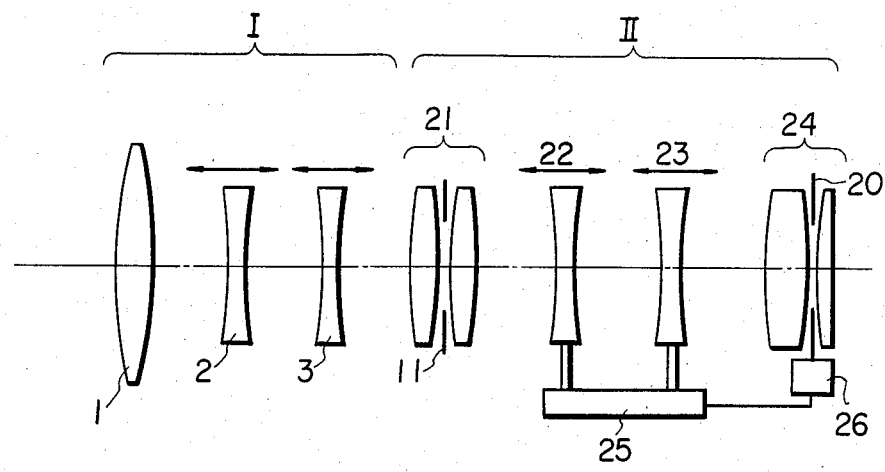
FIG. 1
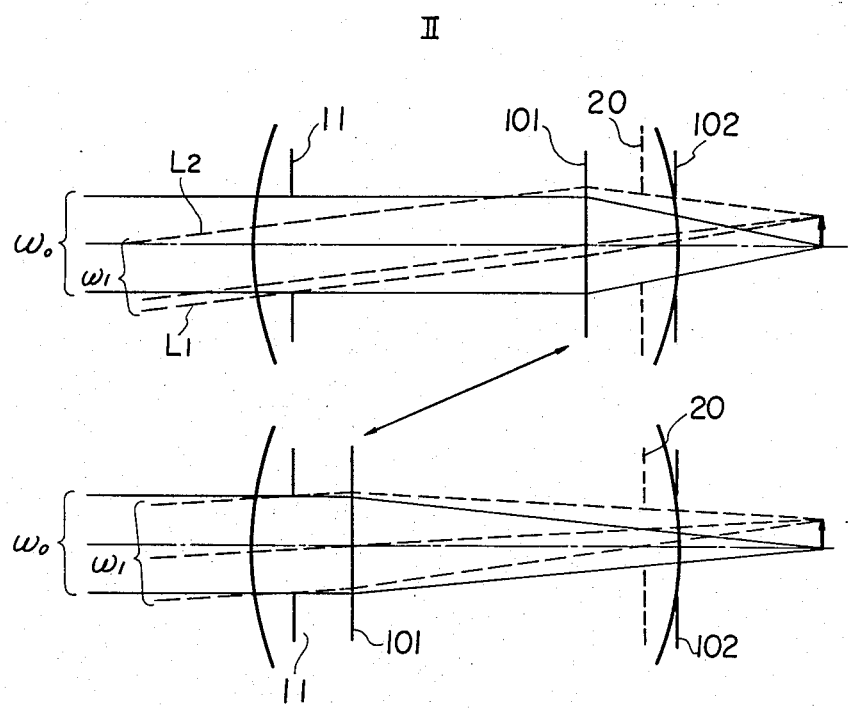
FIG. 2A
FIG. 2B

SPHERICAL ABERRATION

ASTIGMATISM

DISTORTION ABERRATION f=24 f=234.2 f=800

LATERAL ABERRATION

HIGHLY VARIABLE MAGNIFICATION ZOOM LENS SYSTEM HAVING A DIAPHRAGM WITH ITS APERTURES DIAMETER VARIED IN RELATION WITH ZOOMING

BACKGROUND OF INVENTION

The present invention is related to a zoom lens with its magnification variation range being able to be consecutively enlarged, wherein chiefly the halo generated by the use of a means to enlarge the magnification variation range is prevented.

A zoom lens is composed by a front zoom part to determine the magnification variation (ratio) of focal distance and a rear fixed relay part to determine the magnification variation range of focal distance. And a zoom lens, in which said rear fixed relay part is replaced with another zoom lens for enlarging the magnification variation range, is known as a so-called double zoom lens.

SUMMARY OF INVENTION

An object of the present invention is to prevent the halo or coma (aberration) generated in a highly variable mangification zoom lens system which consists of a front zoom part and a rear part and is made as a zoom lens having a diaphragm at its front end by providing such plural number of lens systems as can be relatively moved from one direction to the other within said rear part. For achieving this object, a diaphragm for adjusting oblique luminous flux, varying the aperture diameter along with the movable lens is provided.

BRIEF DESCRIPTION OF DRAWINGS

FIG. 1 is a drawing to show a specific example of the present invention.

FIG. 2A and FIG. 2B are drawings to explain the state in which halo or coma (aberration) is generated.

FIG. 4A through FIG. 4F are drawings for various aberrations of a lens system shown in FIG. 3, wherein FIG. 4A is a curve drawing for spherical aberration, FIG. 4B is a curve drawing for astigmatism, FIG. 4C is a curve drawing for distortion of image, and FIG. 4D, 4E and 4F are curves for lateral aberration.

DESCRIPTION OF THE PREFERRED EMBODIMENTS

Figure 3:
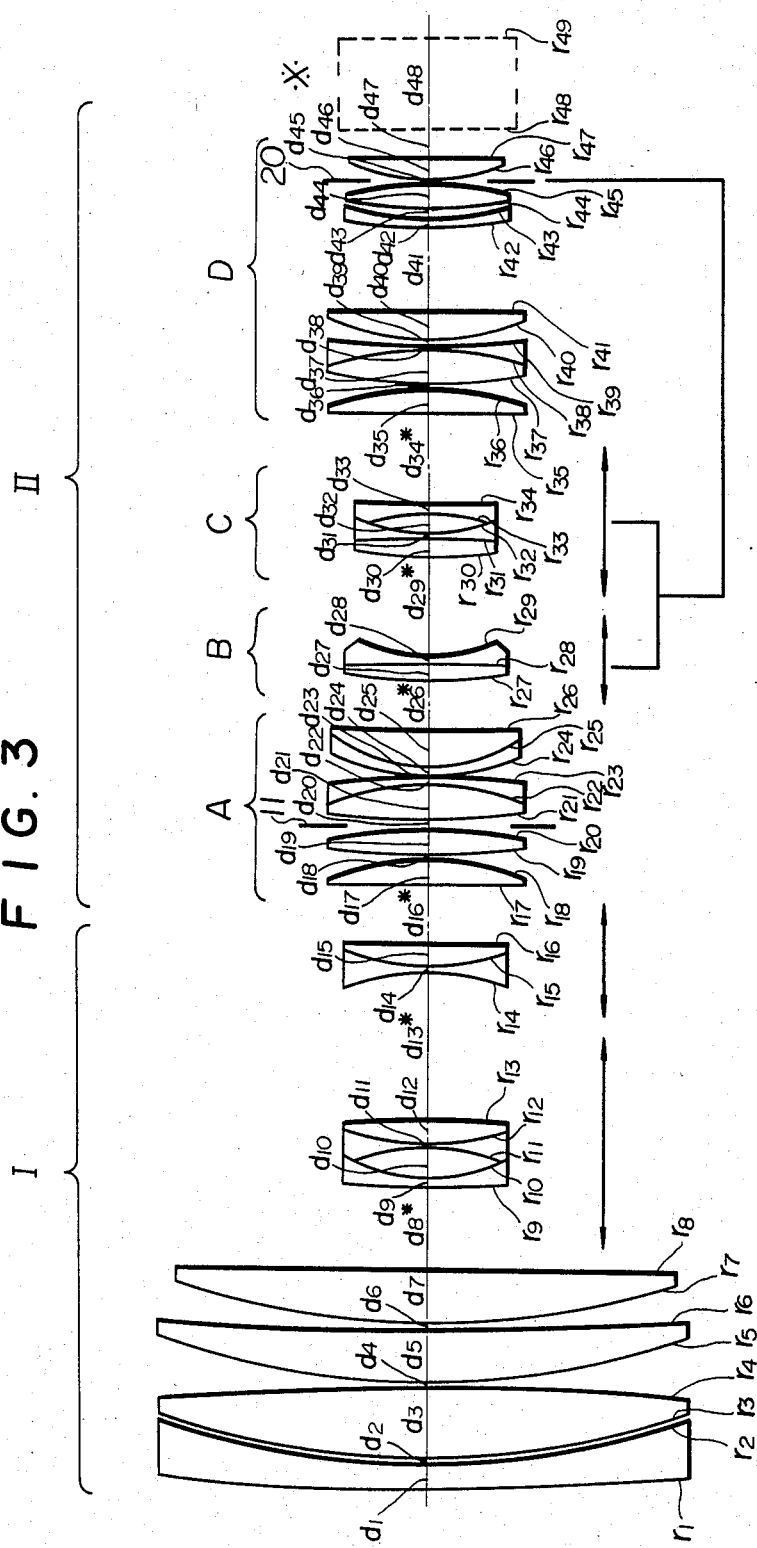
FIG. 3 is a drawing, for example, of a zoom lens to which the present invention is applied.

In FIG. 1, I is a front zoom part, II is a rear zoom part which is coupled with the front zoom part. The front zoom part I has a focusing lens 1, a variator lens 2, and a compensator lens 3. And the rear zoom part II has a fixed lens 21, a movable lens 22 to correct the shifting of image, a movable lens 23 having a function of varying focal distance, and a fixed imaging lens 24. 11 is a diaphragm to determine a relative aperture corresponding to the brightness of an object.

On the other hand, 20 is a diaphragm for adjusting oblique luminous flux and is provided within the fixed imaging lens 24. This diaphragm 20 has the size of aperture varied by a "diaphragm opening and closing means" 26 which is moved by a means to shift the movable lenses 22 and 23. As a means to shift such lens, for example, a cam ring is used and the rotation of said cam ring moves a diaphragm opening and closing lever through a combination of gears or a link mechanism.

Firstly, functions of this optical system will be explained. It is suppposed that the zooming ratio of the front zoom part I is 10 times, and the zooming ratio of the rear zoom part II is two times, and the shortest focal distance of the total lens system which is made up with the zoom parts I and II is 20 mm.

Since the front zoom part I is operated in zooming the focal distance of the total lens system changes from 20 mm to 200 mm, then, as the rear zoom part II is operated in zooming, the focal distance of the total lens system is changed from 200 mm to 400 mm. This zoom lens system can thus be used as a zoom lens of 10 times magnification having any desired range of focal distance within a range of 20 mm to 400 mm by the rear zoom part II at any desired fixed zooming position and operating the front zoom part I for zooming.

As this rear zoom part II has a diaphragm 11 in front of the movable lenses 22 and 23, it becomes a zoom lens of front diaphragm type. Here, if the diaphragm 11 is positioned behind the movable lens 23, the distance from the front lens 1 of the front zoom part I to the diaphragm becomes long and the incident position of the oblique luminous flux which passes through the front lens 1 of the front zoom part I will be largely apart from the optical axis, therefore the lens diameter will become very large to cover the same and will be difficult to be used in photographing. And in a zoom lens of front diaphragm type, great change will take place in a circumferential light volume for a picture by the zooming operation. The reason therefor will be explained now. FIG. 2A shows a case of the shortest focal distance in such zoom lens of front diaphragm type as the rear zoom part II, while FIG. 2B shows the case of the longest focal distance in the same zoom lens. In the drawings, 11 is a diaphragm and 20 is a diaphragm for adjusting oblique luminous flux. 101 is a secondary principal plane of this zoom lens while 102 is a lens holding ring of a lens barrel to determine the effective diameter of the zoom lens.

In the case of the shortest focal distance (FIG. 2A), the luminous flux $\omega_0$ on the axis will have its size of the luminous flux determined by the diaphragm 11, while in the off-axis rays $\omega_1$, the lower light beam $L_1$ is restricted by the diaphragm 11 and the upper light beam $L_2$ is restricted by the effective diameter which is determined by the member 102. If at that time the upper light beam $L_2$ is made to be shielded by the diaphragm 11, the vignetting by the member 102 will not take place, but the aberration correction of the lens will become very difficult on the other hand. Therefore in a zoom lens of front diaphragm type occurrence of vignetting is tacitly permitted.

Next, as zooming operation is done, the secondary principal plane 101 moves to the direction of the diaphragm 11 as shown in FIG. 2B and the imaging plane position is kept constant. In the case of the longest focal distance both the axial luminous flux $\omega_0$ and the off-axial rays $\omega_1$ will have their size of luminous flux determined by the diaphragm 11 and vignetting will not take place, but halo or comatic flare will take place deteriorating imaging characteristics. While the reason for this kind of characteristics deterioration is that the circumferential light volume varies, the number of lenses composing the zoom lens must be greatly increased to correct aberration for preventing said variation, thus it is inconvenient.

In the present invention, when zooming operation is done for the rear zoom part II, the oblique luminous flux adjusting diaphragm 20 which is provided behind the movable lens 23 is so adjusted through the means 25 and 26 that the aperture diameter is large in the case of the shortest focal distance and the aperture diameter is small in the case of the longest focal distance (FIG. 1). And as a result, the movable lenses 22 and 23 are shifted thereby changing the focal distance, and as the focal distance becomes long the aperture of the diaphragm 20 gradually shrinks shielding the upper light beam of off-axis rays so that the circumferential light volume is always kept constant.

Next, one example of figures in accordance with FIG. 3 wherein the present invention is applied to TV lens will be shown below. The numbers and marks in this drawing correspond to those in FIG. 1, wherein A is 21, B is 22, C is 23 and D is 24. Focal distance : 24 to 800 Zoom ratio: 1 : 33.3 Maximum relative aperture: 1 : 1.8 to 1 : 4.6 (shortest focal distance - longest focal distance)

adjusting diaphragm will be 47.8 mm $\theta$ to 28.5 mm $\theta$ (shortest focal distance to longest focal distance) at 0.1 mm behind $\gamma 45$.

Figure 4A:
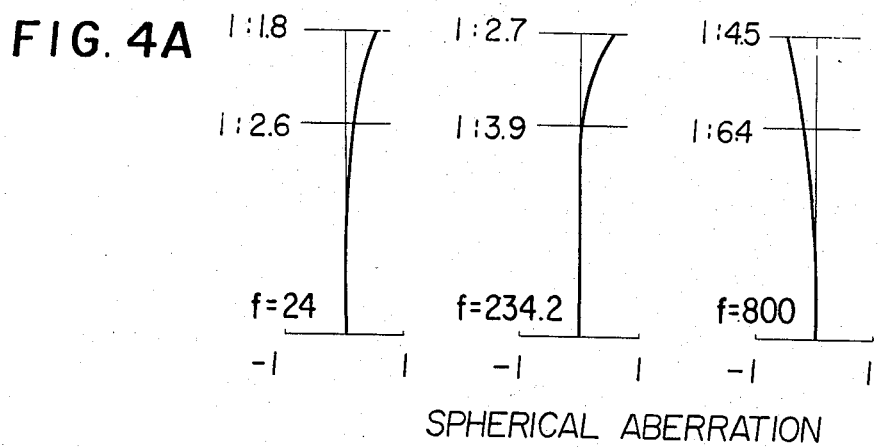
Figure 4B:
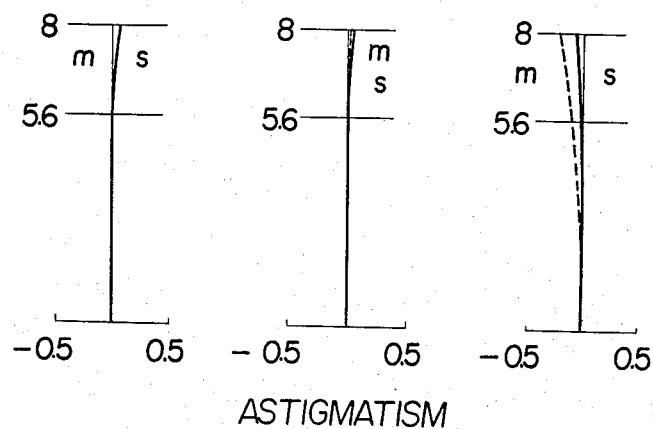
Figure 4C:
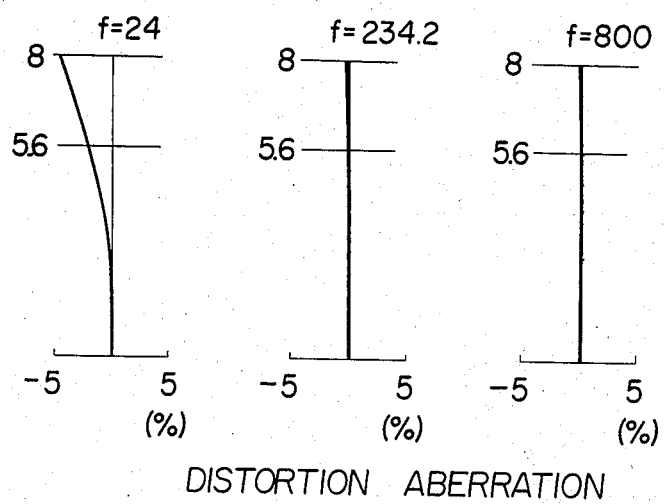
Figure 4D:
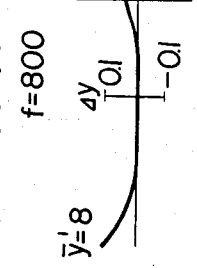
Figure 4D:
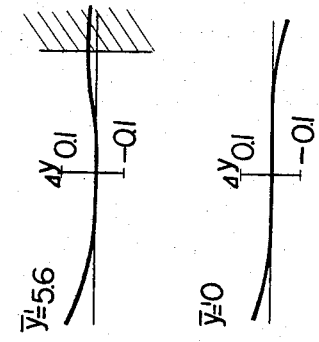
Figure 4E:
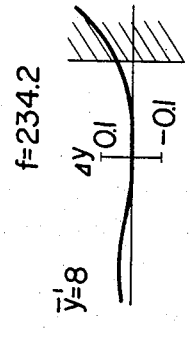
Figure 4E:
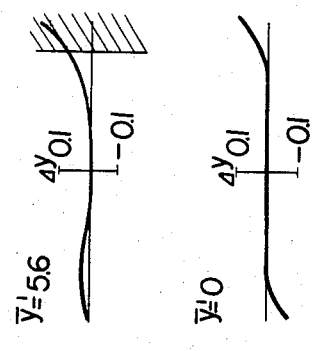
Figure 4F:
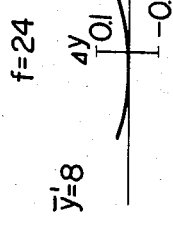
Figure 4F:
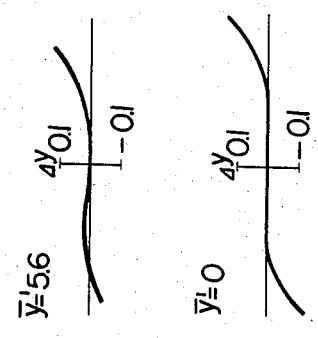

FIG. 4A, FIG. 4B and FIG. 4C show the spherical aberration, astigmatism and distortion aberration, for $f = 24$ mm, $f = 234.2$ mm, $f = 800$ mm in the total lens system in the above mentioned example. FIG. 4D, 4E and 4F show lateral aberration of the same lens system, and the hatched parts within the drawings show such portions as being shielded by the oblique luminous flux adjusting diaphragm according to the present invention, and as such portions are cut out, the quality of picture is improved.

As has been explained above according to the present invention, without necessity for replacing the rear fixed relay part or installing magnification amplification optical system, the magnification variation range of focal distance can be consecutively varied, and an oblique luminous flux adjusting means is activated in

|   |   | $\gamma$ | d | n | $\nu$ |
|---|---|---|---|---|---|
| I | 1 | 1086.39 | 8 | 1.7552 | 27.5 |
|   | 2 | 283.68 | 1.48 |   |   |
|   | 3 | 280.91 | 23.31 | 1.51633 | 64.1 |
|   | 4 | −1173.26 | 0.2 |   |   |
|   | 5 | 289.546 | 17.62 | 1.51633 | 64.1 |
|   | 6 | 1566.37 | 0.2 |   |   |
|   | 7 | 278.268 | 13.27 | 1.51633 | 64.1 |
|   | 8 | 921.892 | *0.5517 — | 183.958 — | 228.885 |
|   | 9 | 364.93 | 3 | 1.816 | 46.8 |
|   | 10 | 70.69 | 9 |   |   |
|   | 11 | −87 | 2.52 | 1.816 | 46.8 |
|   | 12 | 96.245 | 6 | 1.92286 | 20.9 |
|   | 13 | −788.25 | *235.681 — | 29.5934 — | 7.3484 |
|   | 14 | −101.8 | 3.02 | 1.7859 | 44.2 |
|   | 15 | 100.08 | 10 | 1.80518 | 25.4 |
|   | 16 | −308.8 | *5.9945 — | 28.6778 — | 5.9945 |
| II A | 17 | −204.0 | 6 | 1.48749 | 70.1 |
|   | 18 | 104.18 | 0.2 |   |   |
|   | 19 | 261.69 | 6.5 | 1.48749 | 70.1 |
|   | 20 | −200.33 | 3.511 |   |   |
|   | 21 | 234.581 | 12.782 | 1.60311 | 60.7 |
|   | 22 | −88.1214 | 3.5 | 1.80518 | 25.4 |
|   | 23 | −289.98 | 0.2 |   |   |
|   | 24 | 79.5181 | 3 | 1.7552 | 27.5 |
|   | 25 | 54.7653 | 10.476 | 1.62041 | 60.3 |
|   | 26 | 431.945 | *13.1102 — | 17.6795 — | 16.5754 |
| B | 27 | 138.145 | 5.957 | 1.71736 | 29.5 |
|   | 28 | −633.921 | 2.5 | 1.72 | 50.3 |
|   | 29 | 59.18 | *7.1707 — | 26.2014 — | 43.7055 |
|   | 30 | 123.27 | 4.772 | 1.92286 | 21.3 |
|   | 31 | −382.77 | 2.5 | 1.816 | 46.8 |
| C | 32 | 69.0452 | 6.815 |   |   |
|   | 33 | −74.2236 | 2.5 | 1.816 | 46.8 |
|   | 34 | 413.701 | *42.8562 — | 19.2562 — | 2.8562 |
|   | 35 | −600.211 | 7.736 | 1.60311 | 60.7 |
|   | 36 | −109.249 | 0.2 |   |   |
|   | 37 | 146.829 | 11.823 | 1.60311 | 60.7 |
|   | 38 | −139.73 | 3 | 1.80518 | 25.4 |
|   | 39 | 1373.05 | 0.2 |   |   |
|   | 40 | 129.318 | 7.872 | 1.60311 | 60.7 |
|   | 41 | 1539.52 | 29.808 |   |   |
|   | 42 | 110.432 | 3 | 1.71736 | 29.5 |
|   | 43 | 70.8992 | 6.566 |   |   |
|   | 44 | 162.808 | 6.778 | 1.51633 | 64.1 |
|   | 45 | −360.162 | 0.2 |   |   |
| D | 46 | 79.4534 | 7.974 | 1.51633 | 64.1 |
|   | 47 | 65.2088 | 20 |   |   |
| ★ | 48 |   |   |   |   |
|   | 49 |   | 69.2 | 1.51633 | 64.1 |

In the above table, $\gamma$ is radius of curvature. $d$ is a thickness of lens or lens interval. $n$ is a refractive index of lens. $\nu$ is Abbe number.

Figures with asterisk mark * show the cases of the focal distance being the shortest, middle and the longest. The mark ★ shows a color resolving prism system.

The diaphragm to determine relative aperture will become the maximum aperture 64.7 mm$\theta$ at 1.5 mm behind the $\gamma 20$ in FIG. 3. The oblique luminous flux connection with the use of a means to vary the magnification variation range at that time, thus the upper light beam of the off-axis rays is properly shielded.

What is claimed is:

1. A highly variable magnification zoom lens system having a diaphragm with its aperture diameter varied in relation to zooming comprising;
    a front zoom part and a rear zoom part arranged consecutively in order, said front zoom part containing a lens group for focusing an object and a plurality of movable lens groups, said rear zoom part containing a fixed lens group, a plurality of movable lens groups and a fixed imaging lens group disposed at an image plane side spaced from said movable group;

an aperture setting means interposed between the rearmost movable lens group of said front zoom part and the frontmost movable lens group of said rear zoom part for determining relative aperture of the total zoom lens system;

a shifting means for displacing each of the movable lens groups of said rear zoom part along the optical axis; and a shielding means disposed at an image plane side spaced from the movable lens groups of said rear zoom part and being actuated by said shifting means independently of said aperture setting means, the aperture size of said shielding means becomes smaller as the focal distance of the total lens becomes longer.

2. The highly variable magnification zoom lens having a diaphragm with its aperture diameter varied in relation to zooming according to claim 1, in which said shielding member is a diaphragm which is controlled by means so that as the focal distance of the total lens system becomes longer, the aperture diameter of said diaphragm becomes smaller.

3. A highly variable magnification zoom lens system as claimed in claim 1, in which said front zoom part is composed of a focuing lens group and two movable lens groups arranged in order, while said rear zoom part is composed of a fixed lens group, two movable lens groups and a fixed imaging lens group arranged in order, and said aperture setting means is a diaphragm interposed between rear movable lens group of said front zoom part and front movable lens group of said rear zoom part, and said shielding means is a diaphragm disposed at an image plane side spaced from two movable lens groups of said rear zoom part.

4. A highly variable magnification zoom lens as claimed in claim 1, wherein said shielding means is located within said fixed imaging lens group.

5. A highly variable magnification zoom lens system as claimed in claim 1, wherein said front zoom part is provided with a focusing lens group and two movable lens groups arranged in order and wherein said rear zoom part is provided with a fixed lens group, two movable lens groups and said fixed imaging lens group arranged in order, said aperture setting means is a diaphragm mounted within said fixed lens group, and said shielding means is a diaphragm mounted within said fixed imaging lens group.

6. A highly variable magnification zoom lens system as claimed in claim 3, wherein said four movable lens groups have negative power, and wherein said focusing lens group, fixed lens group and fixed imaging lens group have positive power.

* * * * *